United States Patent
Cao et al.

(10) Patent No.: US 11,635,311 B2
(45) Date of Patent: Apr. 25, 2023

(54) MULTI-RATE DIGITAL SENSOR SYNCHRONIZATION

(71) Applicant: Harman Becker Automotive Systems GmbH, Karlsbad (DE)

(72) Inventors: Yuliu Cao, Suzhou (CN); Juergen Zollner, Straubing (DE); Franz Lorenz, Kelheim (DE); Bin Gao, Taizhou (CN); Shiyu Chen, Shanghai (CN); Tingting Zhou, Suzhou (CN); Alex Lee, Shanghai (CN)

(73) Assignee: Harman Becker Automotive Systems GmbH, Karlsbad (DE)

( * ) Notice: Subject to any disclaimer, the term of this patent is extended or adjusted under 35 U.S.C. 154(b) by 241 days.

(21) Appl. No.: 16/421,455

(22) Filed: May 23, 2019

(65) Prior Publication Data

US 2019/0360848 A1   Nov. 28, 2019

Related U.S. Application Data

(63) Continuation of application No. PCT/CN2018/088347, filed on May 25, 2018.

(51) Int. Cl.
| | |
|---|---|
| *G01D 18/00* | (2006.01) |
| *G01D 21/02* | (2006.01) |
| *H04Q 9/04* | (2006.01) |
| *H04L 7/00* | (2006.01) |

(52) U.S. Cl.
CPC .............. *G01D 18/00* (2013.01); *G01D 21/02* (2013.01); *H04L 7/0008* (2013.01); *H04Q 9/04* (2013.01)

(58) Field of Classification Search
CPC ........... H04Q 9/04; H04Q 9/14; G01D 18/00; G01D 21/02; H03H 17/0628; H03H 17/0275; H03H 17/028; H03H 17/0642; H03H 17/0621; H03H 17/0614; G06F 19/00; G06F 1/12; G08C 15/02; H04L 7/0008; H04L 43/024; H04L 43/026; H04L 7/0029; H04L 25/05
See application file for complete search history.

(56) References Cited

U.S. PATENT DOCUMENTS

| | | | |
|---|---|---|---|
| 2009/0128379 A1* | 5/2009 | Rosenthal | .......... H03H 17/0685 341/61 |
| 2010/0057228 A1* | 3/2010 | Kong | ................. H03H 17/0671 700/94 |

(Continued)

FOREIGN PATENT DOCUMENTS

| | | | |
|---|---|---|---|
| EP | 3226499 A1 | 10/2017 | |
| WO | WO-2017070588 A1 * | 4/2017 | ............. G06F 13/38 |
| WO | 2017207655 A1 | 12/2017 | |

*Primary Examiner* — Yoshihisa Ishizuka
*Assistant Examiner* — Carter W Ferrell
(74) *Attorney, Agent, or Firm* — Angela M. Brunetti

(57) ABSTRACT

A system and method for multi-rate synchronization of a digital sensor that provides a digital sensor output signal and a processor arrangement that processes the digital sensor output signal according to a processing algorithm and that provides a processor output signal, including operating the digital sensor to provide the digital sensor output signal with a first sample rate, and operating the processor arrangement to provide a processor output signal with a second sample rate. The second sample rate is an integer multiple of the first sample rate.

14 Claims, 12 Drawing Sheets

(56) References Cited

U.S. PATENT DOCUMENTS

| | | | |
|---|---|---|---|
| 2013/0096812 A1* | 4/2013 | Kawakami | G06F 19/00 |
| | | | 701/114 |
| 2016/0007101 A1 | 1/2016 | Straeussnigg et al. | |
| 2018/0198545 A1* | 7/2018 | Aichriedler | H04L 12/40 |
| 2020/0186448 A1* | 6/2020 | Avantaggiati | H03H 17/0275 |

* cited by examiner

MULTI-RATE DIGITAL SENSOR SYNCHRONIZATION

CROSS REFERENCE TO RELATED APPLICATION

This application is a continuation application that claims the benefit of PCT/CN2018/088347, filed May 25, 2018, the disclosure of which is incorporated in its entirety by reference.

TECHNICAL FIELD

The disclosure relates to a system and method (generally referred to as a "system") for multi-rate digital sensor synchronization.

BACKGROUND

When utilizing a digital sensor in connection with a digital processor, the processor requires information when new data from the sensor becomes available in order to perform an update of a data evaluation algorithm executed by the processor. If the processor receives the sensor data delayed or not synchronized with a processing period of the data processing algorithm or with a sample rate departing from the sample rate of the sensor, the performance of the data processing algorithm may deteriorate. In common systems utilizing digital sensors, the data processing algorithm operates asynchronous with the sensor. A multiplicity of algorithms such as active noise cancellation (ANC) algorithms that include road noise cancellation (RNC) algorithms require a low latency between the input of the data from the corresponding acoustic or acceleration sensor and output the of the algorithm results. Thus, a synchronization mechanism is desired that allows to synchronize a digital sensor and a subsequent digital data processing with a small total latency.

SUMMARY

The disclosure relates to an example method for multi-rate synchronization of a sensor that provides a digital sensor output signal and a processor arrangement that processes the digital output signal according to a processing algorithm and that provides a processor output signal. The method includes operating the digital sensor to provide the sensor output signal with a first sample rate, and operating the processor arrangement to provide a processor output signal with a second sample rate. The second sample rate is an integer multiple of the first sample rate.

The disclosure relates to an example system for multi-rate synchronization of a sensor that is configured to provide a digital sensor output signal and a processor arrangement that is configured to process the digital output signal according to a processing algorithm and to provide a processor output signal. The digital sensor is further configured to provide the sensor output signal with a first sample rate. The processor arrangement is further configured to provide the processor output signal with a second sample rate. The second sample rate is an integer multiple of the first sample rate.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

DESCRIPTION OF THE DRAWINGS

The system may be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
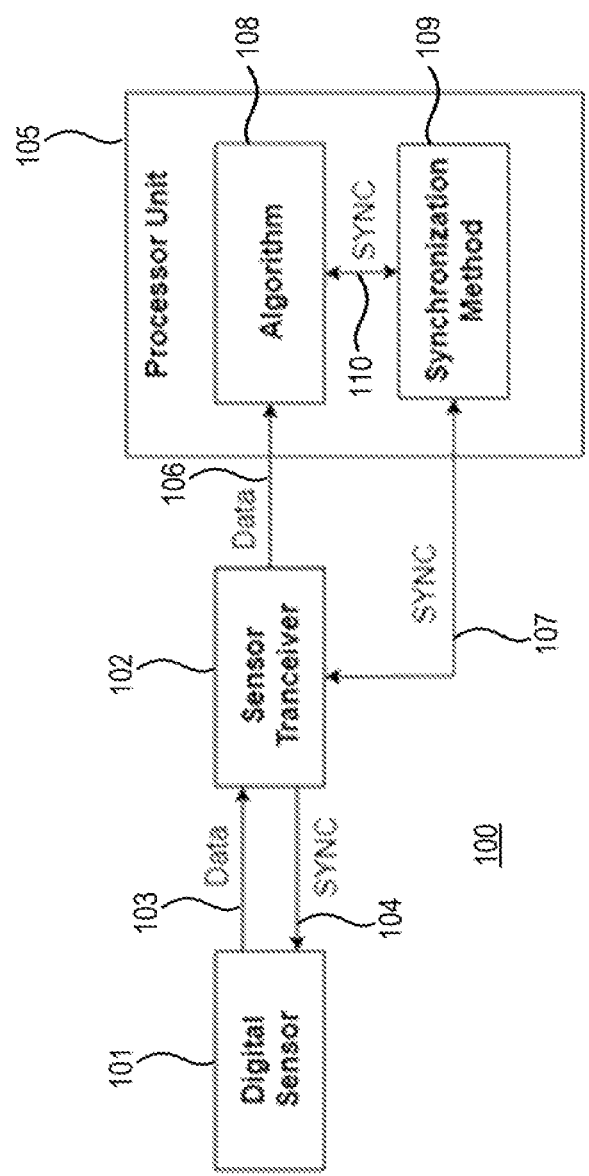
FIG. 1 is a schematic diagram illustrating a general structure of an exemplary multi-rate system.

A sensor is a device, module, or subsystem whose purpose is to detect conditions, events or changes in its environment and to generate corresponding information, for example, an appropriate type of optical, acoustic or electrical information including analog signals or digital signals such as data streams. A digital sensor is an electronic sensor in which data conversion and data transmission are performed digitally, e.g., in a binary format. A (digital) processor or processing unit is an electronic circuit which performs operations on some external data or a data stream from at least one of a memory and an external device such as a sensor. Processors may be specialized for specific duties and as such may be combined with additional hardware including other processors. Thus, a processor arrangement includes one or more processors (processor units). The operations of a processor may be controlled by instructions allocated by a software which may implement one or more algorithms including adaptive algorithms. An algorithm is an unambiguous specification of how to solve a class of problems. Algorithms can perform calculations, data processing and automated reasoning tasks. An algorithm can be expressed within a finite amount of space and time and in a well-defined formal language for calculating a function, such as, e.g., software. Starting from an initial state and initial input, instructions describe a computation that, when executed, proceeds through a finite number of well-defined successive states, eventually producing "output" and terminating at a final ending state. The transition from one state to the next is not necessarily deterministic.

Signal processing algorithms for processing digital signals (e.g., data streams) from digital sensors that are not able to provide data at (target) sample-rates of the signal processing algorithms may be triggered on a regular basis to allow the input data signals from the digital sensors (sensor data) to be received in a synchronized multi-rate manner. For example, in a single processor architecture the internal software that includes the above-mentioned signal processing routines may generate a trigger request to the sensor transceiver to allow the data to be processed in a multi-rate synchronized way. For example, in a signal processing architecture in which a processor, e.g., a main or master processing unit, is not able, in terms of sample rate, to support the sensors, e.g., transceivers thereof, the architecture may be extended by an additional processor, e.g., a host or slave processing unit, which may act as a transceiver host. Further, special software routines implemented in at least one of the main processor and the host processor may generate a trigger request to a sensor transceiver to allow the data to be processed in a multi-rate synchronized way between sensor, sensor transceiver, host processor and main processor.

In order to illustrate the enhancements made on latency and complexity by the synchronization mechanism described herein, the single processor solution is used as a baseline reference. The synchronization mechanism may be realized with hardware, software or a combination of hardware and software. Any sensor data provided by the digital sensor are aligned with the target sample rate of the signal processing algorithm utilizing, for example multi-rate and synchronization techniques. As in dual processor systems the two processors may be included in different integrated circuits (IC), inter IC communication boundaries and further sample-rate conversion conflicts may arise which can also be overcome with this synchronization mechanism to allow low-complexity and low-latency data transmission from the digital sensor via the (optional) sensor transceiver to the algorithm processing unit.

Referring to FIG. 1, an exemplary basic system 100 for synchronizing a digital sensor 101 includes a sensor transceiver 102 coupled to the digital sensor 101 via a data line 103 that is configured to transfer data from the digital sensor 101 to the sensor transceiver 102, a synchronization signal line 104 that is configured to transfer a synchronization signal from the sensor transceiver 102 to the digital sensor 101, and, as the case may be, other lines (not shown) such as power supply lines. The digital sensor 101 may be any sensor that outputs a digital signal and that converts a physical entity into the digital signal. Such sensors include microphones and acceleration sensors. A processor 105 is also coupled with the sensor transceiver 102 via a data line 106 to transfer data from the sensor transceiver 102 to the processor 105, a synchronization signal line 107 that is configured to transfer a synchronization signal from the sensor transceiver 102 to the processor 105 and vice versa, and, as the case may be, other lines (not shown) such as power supply lines. An algorithm 108 (e.g., an ANC, RNC or any other algorithm) which may be implemented as software is executed by the processor 105 that processes the data (stream) from the sensor transceiver 102 accordingly to establish, for example, a control unit for ANC such as RNC. Implemented as hardware, software or a combination thereof a synchronization procedure 109 is executed in or by the processor unit 105, which exchanges synchronization signals via the synchronization signal line 107 with the sensor transceiver 102 and further synchronization signals via a (physical or virtual) sensor transceiver line 110 with the algorithm 108.

Thus, a multi-rate system is established which utilizes in at least two of the digital sensor 101, the sensor transceiver 102 and the algorithm 108 diverging sample rates. This multi-rate system utilizes integer fractions and/or multiples of the system clock as diverging sample rates, which has several benefits: Re-sampling between multi-rate clocks is done without asynchronous sample rate conversion that employs common sample rate conversion or decimation/interpolation techniques. Further, sample-rate decimation does not necessarily require anti-alias filters if the signal content is already bandwidth limited and the sampling timing is known from synchronization markers or if the sensor data can maintain their native (multi-rate) sample rate throughout the algorithm processing, so that only interpolation to the target sample-rate is required.

An example scenario is illustrated below with reference to FIG. 2, which is directed to a single-processor system for purposes of illustration, but can also apply to two-processor systems as well as other single-processor systems. Another exemplary system 200 for synchronizing a digital sensor 201 includes a sensor transceiver 202 (e.g., a digital sensor Tx/Rx unit) coupled to the digital sensor 201 via a data line 203 (e.g., a sensor bus) that is configured to transfer data from the digital sensor 201 to the sensor transceiver 202, a synchronization signal line 204 that is configured to transfer a synchronization signal (e.g., SYNC pulses) from the sensor transceiver 202 to the digital sensor 201, and, as the case may be, other lines (not shown) such as power supply lines. A processor 205 is also coupled with the sensor transceiver 202 via a data line 206 (e.g., a peripheral interface) to transfer data from the sensor transceiver 202 to the processor 205, a synchronization signal line 207 that is configured to transfer a synchronization signal (e.g., Tx/Rx synchronization signal or one or more signals of the peripheral interface) from the processor 205 to the sensor transceiver 202, and, as the case may be, other lines (not shown) such as power supply lines. For example, if the peripheral interface is used for synchronization, at least one of a serial peripheral interface (SPI) and a universal asynchronous receiver transmitter (UART) of the peripheral interface may be used for data transmission, and at least one of the SPI, UART and a general purpose input/output (GPIO) for synchronization.

The data stream from the digital sensor 201 has a sensor sample rate $FS_S$ and the sensor same sample rate $FS_S$ is also used in the sensor transceiver 202 and for the algorithm processing. However, the processor 205 utilizes a different sample rate, e.g., processor sample rate $FS_T$, and the algorithm output shall be up-sampled (re-sampled) to the processor sample rate $FS_T$, which is assumed to be the target sample-rate. A multi-rate technique may be involved, provided the target (processor) sample rate $FS_T$ is an integer multiple M of the sensor sample rate $FS_S$, in which M and N are integers:

$$FS_T = M \cdot FS_S, M \in \mathbb{N}.$$

For the synchronization of the sensor sample rate $FS_S$, synchronization markers (triggers) may be used. Upon every new clock event of the sensor sample rate $FS_S$, supported by multi-rate clock generation, a synchronization signal is generated by a corresponding synchronization procedure. The synchronization signal may be used to trigger a data acquisition controller (not shown) included in the digital sensor 201 or to trigger the sensor transceiver 202 which then requests the next sensor sample, or to directly trigger a sensor transceiver controller (not shown) included in the digital sensor 201 or the sensor transceiver 202, wherein the sensor transceiver controller may forward the synchronization markers (triggers) to the digital sensor 201. It is assumed that the sensor transceiver 202 and the digital sensor 201 have been correctly initialized by a sensor initialization unit 208 included in the processor 205 via a peripheral unit 209 (e.g., a sensor hardware peripheral unit). The peripheral unit 209 is also operatively coupled with the data line 206 and included in the processor 205. Further, it is assumed that a correct start-up sequence and sensor operation is supervised by a sensor diagnostic unit 210 which is also included in the processor 205 and operatively coupled with the peripheral unit 209.

For example, a physical synchronization pulse may be transferred separately via a line, which may be connected in parallel to the sensor bus 203 or may be incorporated in the sensor bus 203, to request a new sensor data sample from the digital sensor 201 with the sensor sample rate $FS_S$. Sensor samples may not be decoded directly after the synchronization pulse occurs because a significant period of time, which however is defined and known within the digital sensor 201 and the sensor transceiver 202, lapses during the transfer of the sensor data stream from the digital sensor 201 to the sensor transceiver 202 and from the sensor transceiver 202 via the line 206 (processor peripheral interface) to a sensor data acquisition and decode unit 211. Therefore, the sensor data sample is only then valid when a sensor synchronization delay compensation unit 212 has released the sensor data sample for transfer from the sensor data acquisition and decode unit 211 to an algorithm processing unit 213.

Since the time for sensor delay compensation and algorithm processing in total is significant but small compared to a time period $T_S$ of the sensor data sample rate $FS_S$, the algorithm processing is finished and its result is available before the next sensor sample is requested. Immediately after the algorithm-processing result is available, the re-sampling (up-sampling) to the processor sampling rate $FS_T$ can be triggered, wherein a simple interpolation technique may be applied including low-pass filtering for anti-alias handling. The up-sampling may be performed in an up-sampling unit 214 of the processor 205 which receives from the algorithm processing unit 213 an output data stream with the sensor sample rate $FS_S$ and from a target sample rate clock generation unit 215 of the processor 205 a clock signal with the target sample rate, which is the processor sample rate $FS_T$, to provide an output data stream with the processor (target) sample rate $FS_T$. The clock signal having the processor sample rate $FS_T$ is further supplied to a multi rate clock generator unit 216 which generates therefrom a clock signal with the sensor sample rate $FS_S$, in accordance with, e.g., $FS_T = M \cdot FS_S$. The clock signal with the sensor sample rate $FS_S$ is supplied to a synchronization pulse generation unit 217.

The synchronization pulse generation unit 217 generates the synchronization pulse signal and supplies it to the synchronization signal line 207, the sensor data acquisition and decode unit 211 and the sensor synchronization delay compensation unit 212. Further, a signal that indicates that data acquisition and decoding has been finished is sent by the sensor data acquisition and decode unit 211 to the sensor synchronization delay compensation unit 212 at the end of a data acquisition and decode operation. The time period $T_S$ corresponding to the sensor data sample rate $FS_S$ and a time period $T_T$ corresponding to the processor data sample rate $FS_T$ can be described as follows:

$$T_S = \frac{1}{FS_S}, T_T = \frac{1}{FS_T}.$$

Figure 2:
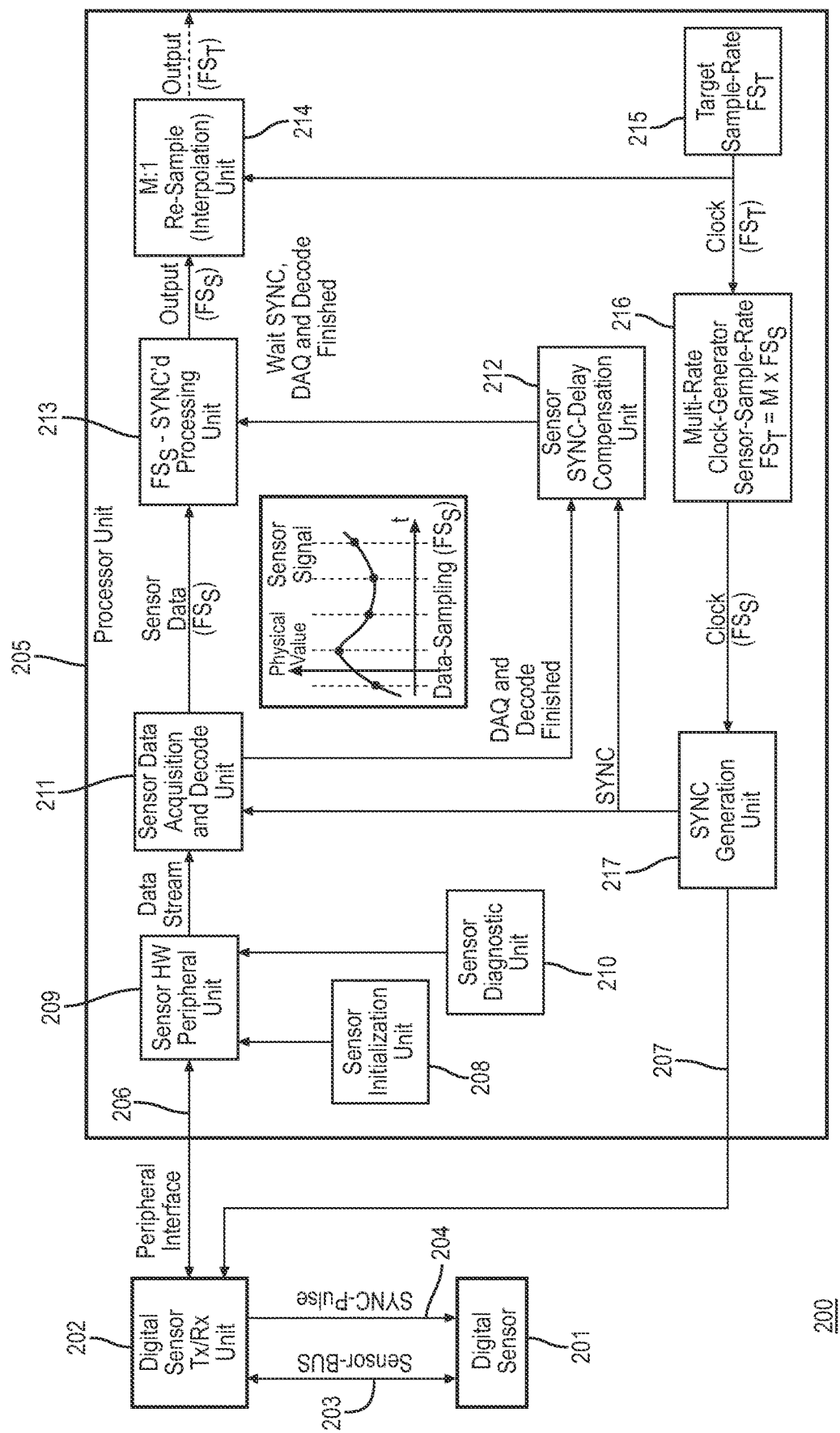
FIG. 2 is a schematic diagram illustrating a more detailed structure of the exemplary multi-rate system shown in FIG. 1.

In a two-processor system, sensor data trigger units, sensor data acquisition and decode units, the initialization and diagnostic units may be implemented in a transceiver host processor (the host processor and the two-processor system are not shown in FIG. 2).

Figure 3:
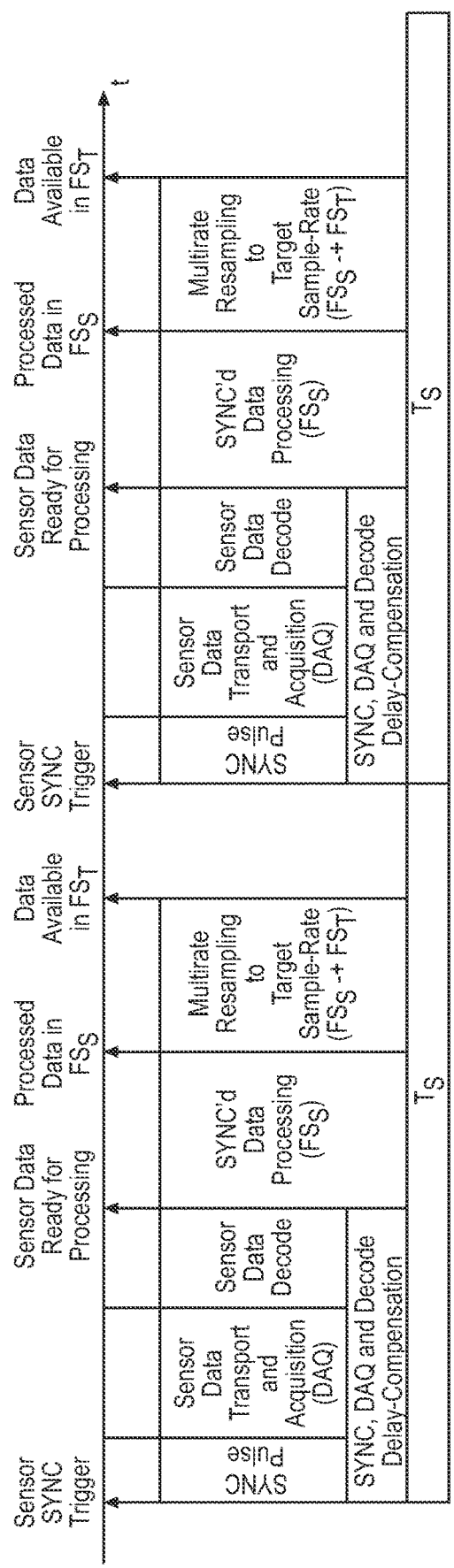
FIG. 3 is a signal-over-time diagram illustrating latencies occurring between synchronization pulse and an output of a final interpolation.

A latency between a sensor data request within the time period $T_S$ corresponding to the sensor data sample rate $FS_S$ and a respective output from the algorithm processing available within the time period $T_T$ corresponding to the processor data sample rate $FS_T$ defines the sensor-to-output latency $t_{Sensor \to Output}$. In specific applications such as, for example, ANC (RNC) systems, this latency is crucial for a successful operation of the whole system. Little to almost no latency should be generated on the data signal path as the latencies along the path accumulate, as illustrated in the diagram shown in FIG. 3. For example, along the signal processing chain, first, the physical synchronization pulse (SYNC pulse) is generated which causes a latency $t_{Sync-Pulse}$, whereby the digital sensor itself is already affected by a latency $t_{Sensor}$ as the sensor consumes time to convert the physical quantity to be sensed into a digital domain signal and to apply some sensor specific signal conditioning. Second, triggering a new sensor sample and transferring the sample from the digital sensor to the sensor transceiver generates a latency $t_{Sensor \to Tx/Rx}$. Third, once data arrive at the sensor transceiver, the sensor data stream is acquired by the processor and decoded to sensor data samples, which generates a latency $t_{Decode}$. Because the data transfer from the sensor may be affected by jitter and timing deviations, such as timing conditions for the involved hardware, a specific offset time, referred to as latency $t_{Offset}$, may be considered to guarantee that the data transfer has been finished before a sensor data sample is used in the algorithm processing.

The algorithm processing may involve any algorithm, including adaptive applications. In such applications, e.g. ANC applications, the sensor data may be used as echo or reference data input into a multiple-input multiple-output (MIMO) finite impulse response (FIR) filter matrix, which may consume a processing time, referred to as latency $t_{Process}$. Finally, the processing result may be interpolated by an, e.g., sample-and-hold or sample-and-zero procedure with subsequent low-pass filtering to reduce anti-alias effects. The interpolation itself may not add significant latency, but the low-pass filtering may create a considerable latency, $t_{Low-Pass}$. The sensor-to-output latency $t_{Sensor \to Output}$ can, thus, be described as follows:

$$t_{Sensor \to Output} = t_{Sensor} + t_{Sync-Pulse} + t_{Sensor \to Tx/Rx} + \\ t_{Tx/Rx \to DAQ} + t_{Offset} + t_{Decode} + t_{Process} + t_{Low-Pass}$$

It is noted that the time for the sensor data stream transfer and decoding is insignificant or even negligible compared to the time consumed at the sensor end for data processing and for low-pass filtering. Because the latency at the sensor end is hardware related, it cannot be easily improved, so that further measures may need to be taken to reduce the latency caused by data processing and low-pass filtering.

Figure 4:
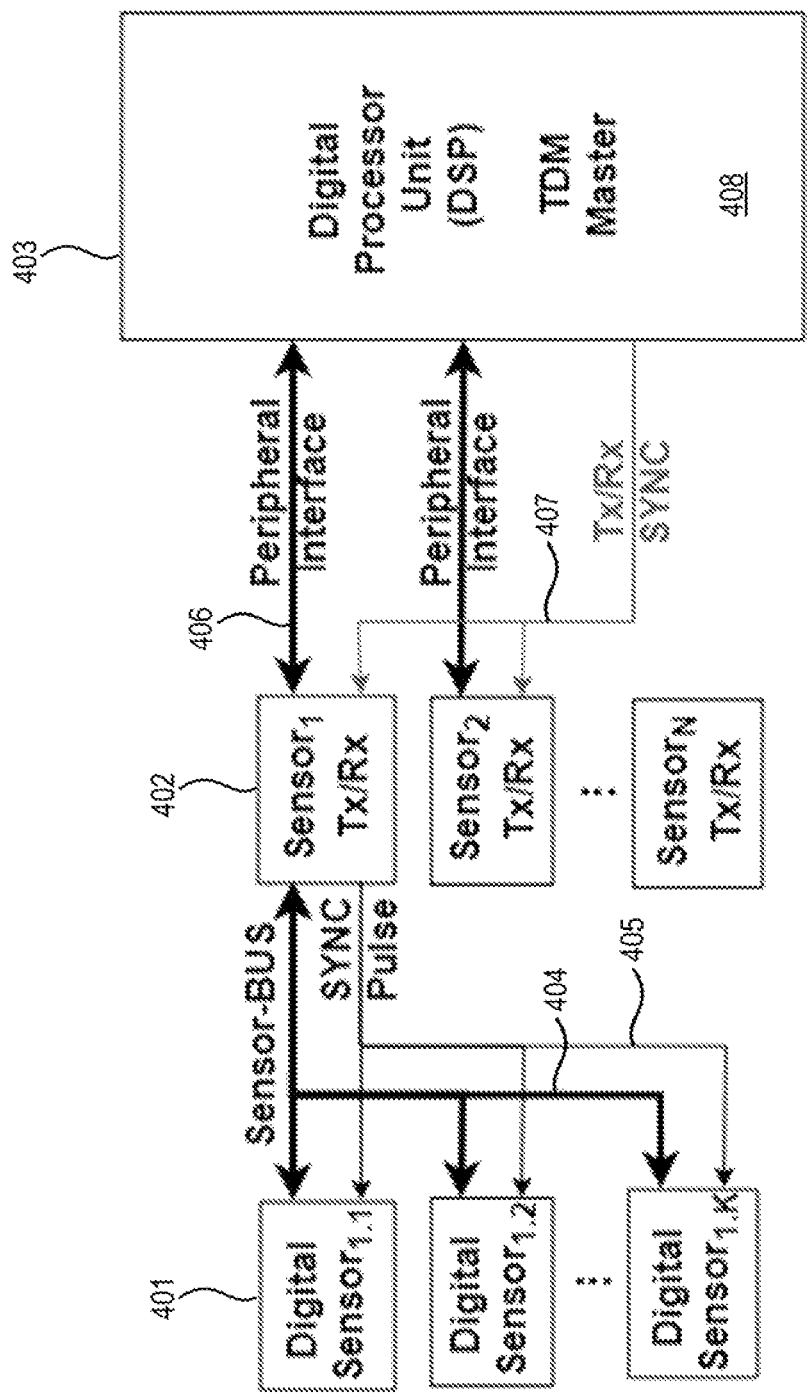
FIG. 4 is a schematic diagram illustrating a structure of an exemplary multi-rate system in one processer/one integrated circuit implementation.

Referring to FIG. 4, in an exemplary implementation K digital sensor transceivers 401, K being an integer and K≥1, may be connected via N sensor transceiver units 402, N being an integer, 1≤N≤K, directly to an algorithm processing unit 403 such as a digital signal processor (DSP). For example, the N sensor transceiver units 402 are connected on one side via a sensor bus 404 and a synchronization pulse line 405 to the K digital sensor transceivers 401, and on the other side via a peripheral interface 406 and a transceiver synchronization line 407 to the algorithm processing unit 403. The algorithm processing unit 403 may be integrated into a separate IC 408. Depending on the number K of digital sensors, the number N of sensor transceiver units required can be determined as each sensor transceiver can only handle a limited number of digital sensors. A single integrated circuit (IC) design of the processor may be connected to the digital sensor, the sensor transceiver and the IC peripheral as depicted in FIG. 4.

Such an implementation is able to operate with sensors compliant with PSI-5 specification v2.1. As a peripheral (unit) a UART may be used, which may be inserted between the transceiver and the processor to allow a chained direct memory access (DMA). The peripheral sensor interface (PSI5) is an interface for automotive sensor applications. PSI5 is an open standard based on existing sensor interfaces for peripheral airbag sensors, already proven in millions of airbag systems. Thus, PSI5 is a flexible, reliable communication standard for automotive sensor applications. The main features of the PSI5 are high speed and high reliability data transfer at the lowest possible implementation overhead and cost. PSI5 covers the requirements of the low-end segment of digital automotive interfaces and offers a universal and flexible solution for multiple sensor applications. It offers a two-wire current interface, Manchester coded digital data transmission, high data transmission speed of 125 kbps or optional 189 kbps, high robustness and low emission in terms of electro-magnetic compatibility (EMC), wide range of sensor supply current, variable data word length (10 to 28 bit with one bit granularity), asynchronous or synchronous operation, different bus modes, and bidirectional communication. The updated Version 2.1 includes updates of the physical and data link layer parameters in order to extend the application field of the PSI5 Interface.

Figure 5:
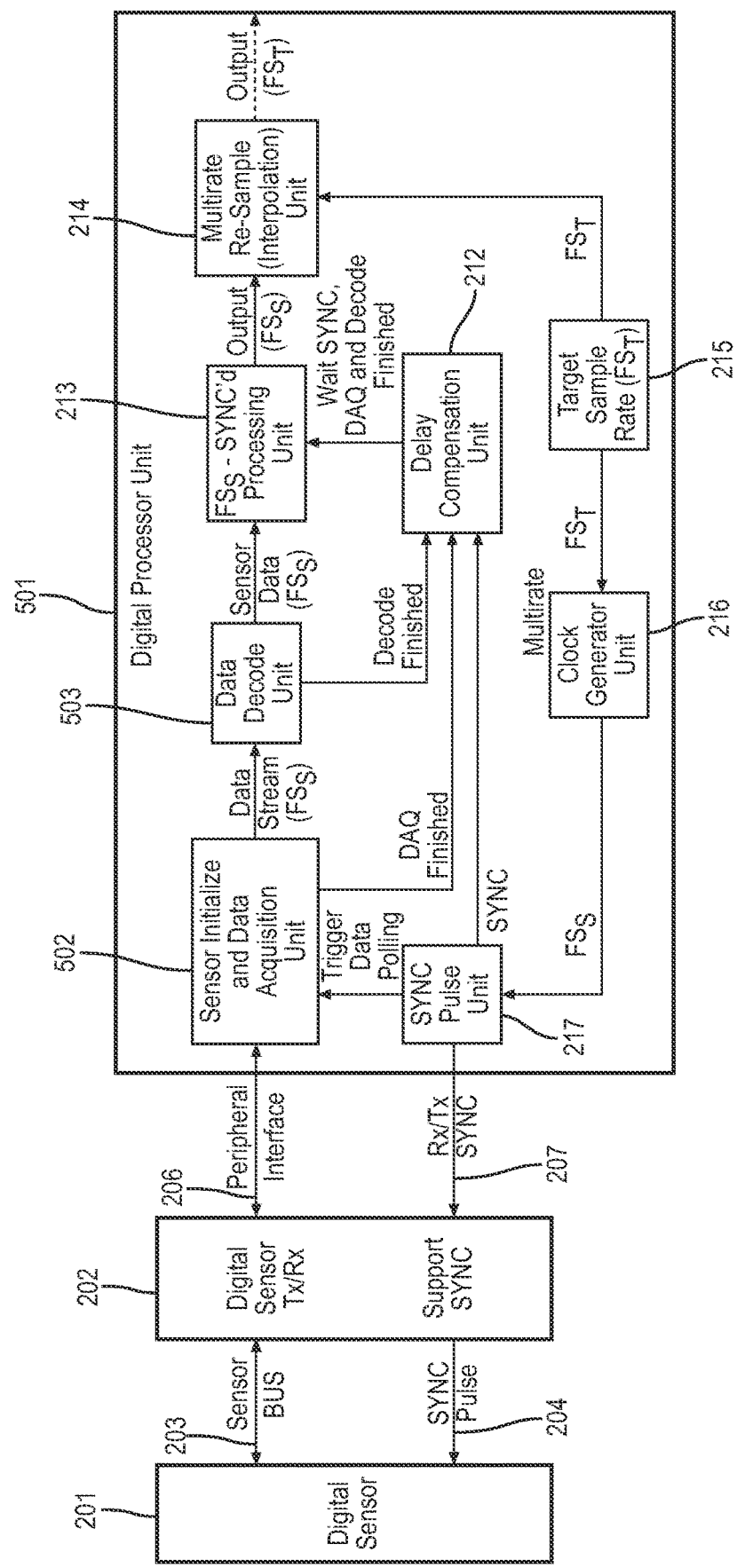
FIG. 5 is a schematic diagram illustrating a more detailed structure of the exemplary multi-rate system shown in FIG. 4.

FIG. 5 illustrates an exemplary, more detailed signal flow structure of the basic system described in connection with FIG. 4 for K=1 and N=1. The system shown in FIG. 5 is similar to the system shown in FIG. 2 but the processor 501 of the system shown in FIG. 5 is different from the processor 205 shown in FIG. 2 as follows: The sensor initialization unit 208, peripheral unit 209 sensor and diagnostic unit 210 have been omitted and the sensor data acquisition and decode unit 211 has been replaced by a sensor initialize and data acquisition unit 502, which receives the data stream from the transceiver 202, and by a data decode unit 503, which is connected between the sensor initialize and data acquisition unit 502 and the algorithm processing unit 213. Instead of the signal that indicates that data acquisition and decoding has been finished, the sensor synchronization delay compensation unit 212 receives a signal that indicates that data acquisition has been finished from the sensor initialize and data acquisition unit 502, and a signal that indicates that decoding has been finished from the data decode unit 503. Based on the clock signal with the sensor sample rate $FS_S$ from the multi rate clock generator unit 216, the synchronization signal, e.g., including one or more synchronization pulses, is generated by the synchronization pulse generation unit 217 and distributed to the sensor transceiver 202 and the sensor synchronization delay compensation unit 212. The synchronization pulse generation unit 217 further generates a signal for triggering data polling in the sensor initialize and data acquisition unit 502.

When data are requested by the synchronization pulse generation unit 217, the UART, i.e., the peripheral interface 206, requests a data transfer on the transceiver side. Once the sensor transceiver 202 has performed a synchronized bit-stream request and transport, e.g., via a PSI-5 bus, the sensor transceiver 202 automatically starts the sample data transfer via the UART (peripheral interface 206), which may be captured on the opposite side via an UART DMA interrupt service routine (ISR) support and without any additional software involvement. During a DMA interrupt, the sensor data are received and are prepared for decoding and multi-rate algorithm processing.

Figure 6:
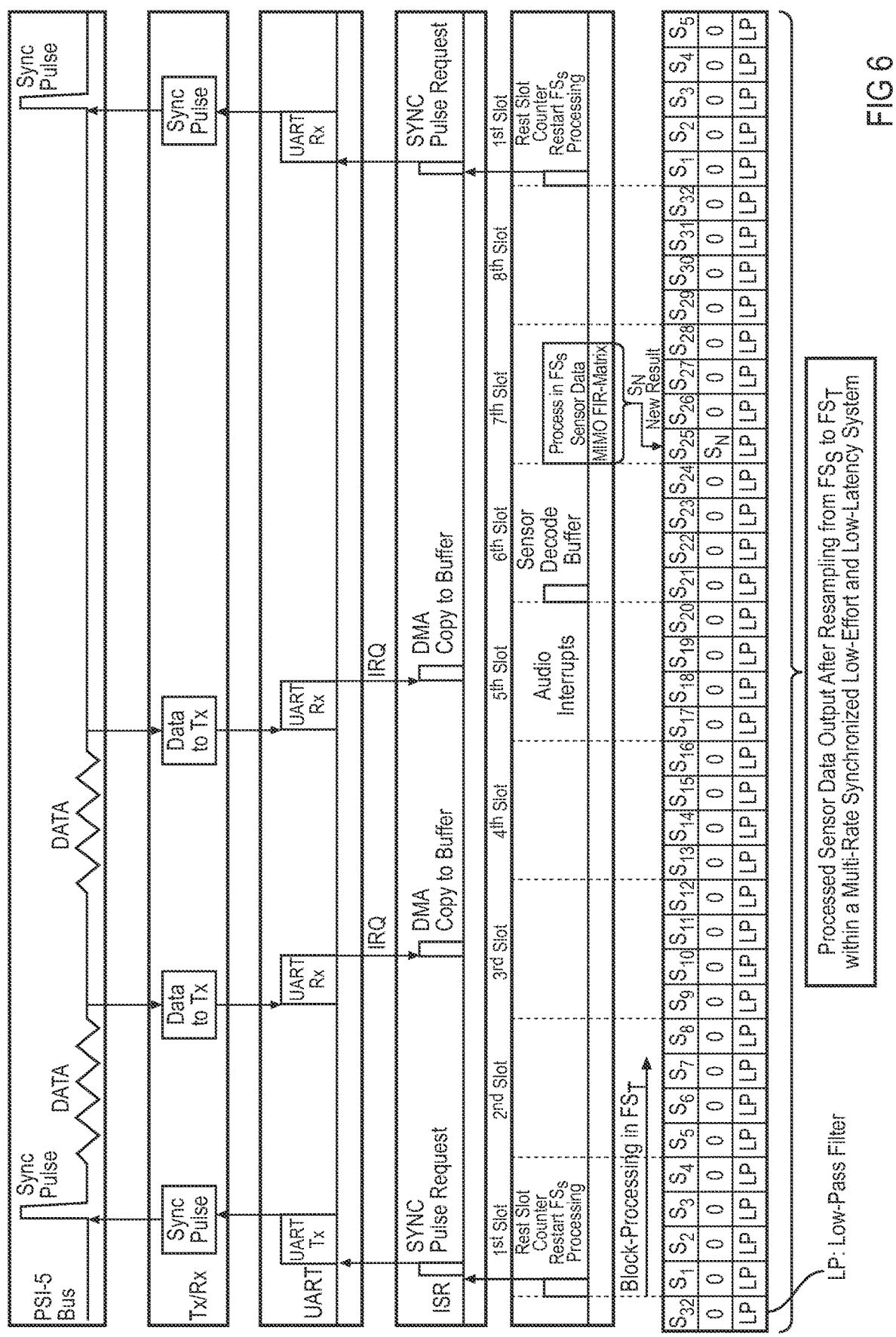
FIG. 6 is a signal-over-time diagram illustrating the timing of an exemplary synchronization method.

FIG. 6 depicts a signal-level time diagram of a PSI-5 bus signal, a transceiver signal Rx/Tx, an UART signal, an ISR signal, and audio interrupts. In this example, the processor 501 is clocked with the processor sample rate $FS_T$, which may be 48 kHz for audio applications, while the sensor and sensor processing is clocked with the frequency $FS_S$, which may be 1.5 kHz. An exemplary multi-rate system that is appropriate for operating in such an environment may have M=32, which means it generates an audio interrupt every four sample at 48 kHz, so that in total eight audio interrupts are available for the algorithm-processing during the time period $T_S$. In the first slot, the synchronization pulse (SYNC pulse) is triggered, starting a waiting period for the sensor data acquisition through UART and PSI-5 transceiver until the sensor data are available in the 5th slot. To be on the safe side, the delay compensation unit may employ a fixed timing scheme, according to which, for example, the sensor data decode is performed in the 6th slot and the algorithm-processing is performed in the 7th slot. In the same slot, the interpolation mechanism may update the 25th sample in the time domain set out by the processor clock frequency $FS_T$ to the newest processing result $S_N$. Since low-pass filtering by the anti-alias filter is applied in all slots, the processing result is available after 25 samples at the target sample rate, which is the processor sample rate $FS_T$.

By reorganizing the above described processing steps, complexity and latency can be improved, i.e., reduced. The processed sensor data, i.e., the result of the processing of the sensor data, may be output in one earlier slot if the sensor data decoding is not executed in a dedicated audio slot of the processor sample rate $FS_T$. The sensor data decoding may be shifted to the UART data receive ISR. The ISR may compensate additional processing complexity by reducing the sensor data decoding to a few static operations if the type of sensor data is predefined. Again, the processor is operated at a processor clock frequency $FS_T$ of 48 kHz for audio application, while the sensor and sensor data processing shall be executed at the sensor clock frequency $FS_S$=1.5 kHz.

Figure 7:
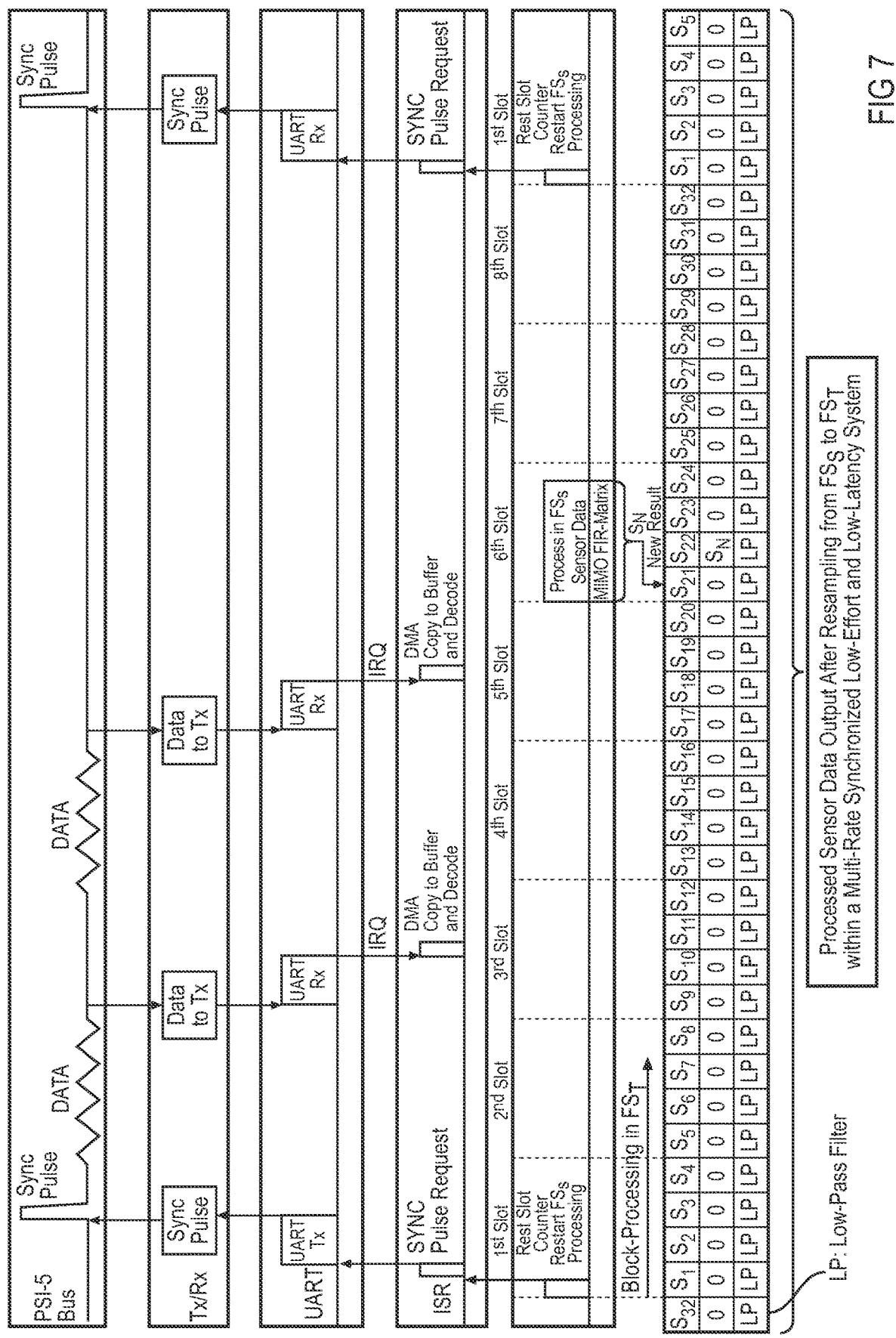
FIG. 7 is a signal-over-time diagram illustrating the timing of another exemplary synchronization method.

To improve the latency of the system, the processed sensor data output can be provided in one earlier slot, if the sensor data decoding is not performed in a dedicated audio task slot. Referring to FIG. 7, sensor data decoding may be shifted, e.g., to the UART data receive ISR. The ISR may compensate additional calculation complexity by reducing the sensor data decoding to a few static operations if the type of sensor data is predefined. Again, the processor unit is operated at a processor sample rate of $FS_T=48$ kHz for audio applications, while the sensor clocking and sensor data processing takes place at the sensor sample rate $FS_S=1.5$ kHz. A multi-rate system can be established with M being 32, in which an audio interrupt occurs every fourth sample at 48 kHz and in total eight audio interrupts are available within the time period $T_S$ for algorithm-processing, as shown in FIG. 7. In the first slot, the synchronization pulse (SYNC pulse) is triggered, starting a waiting period for the sensor data acquisition through UART and PSI-5 transceiver until the sensor data are available in the 5th slot. To be on the safe side, the delay compensation unit may employ a fixed timing scheme, according to which, for example, algorithm processing is performed in the 6th slot. In the same slot, the interpolation mechanism may update the 21th sample in the time domain set out by the processor clock frequency $FS_T$ to the newest processing result $S_N$. Since low-pass filtering by the anti-alias filter is applied in all slots, the processing result is available after 21 samples at the target sample rate, which is the processor sample rate $FS_T$. As can be seen, this is a latency improvement of 4 samples of the processor sample rate $FS_T$, which equates in the present example to a time gain of 83.33 μs.

Figure 8:
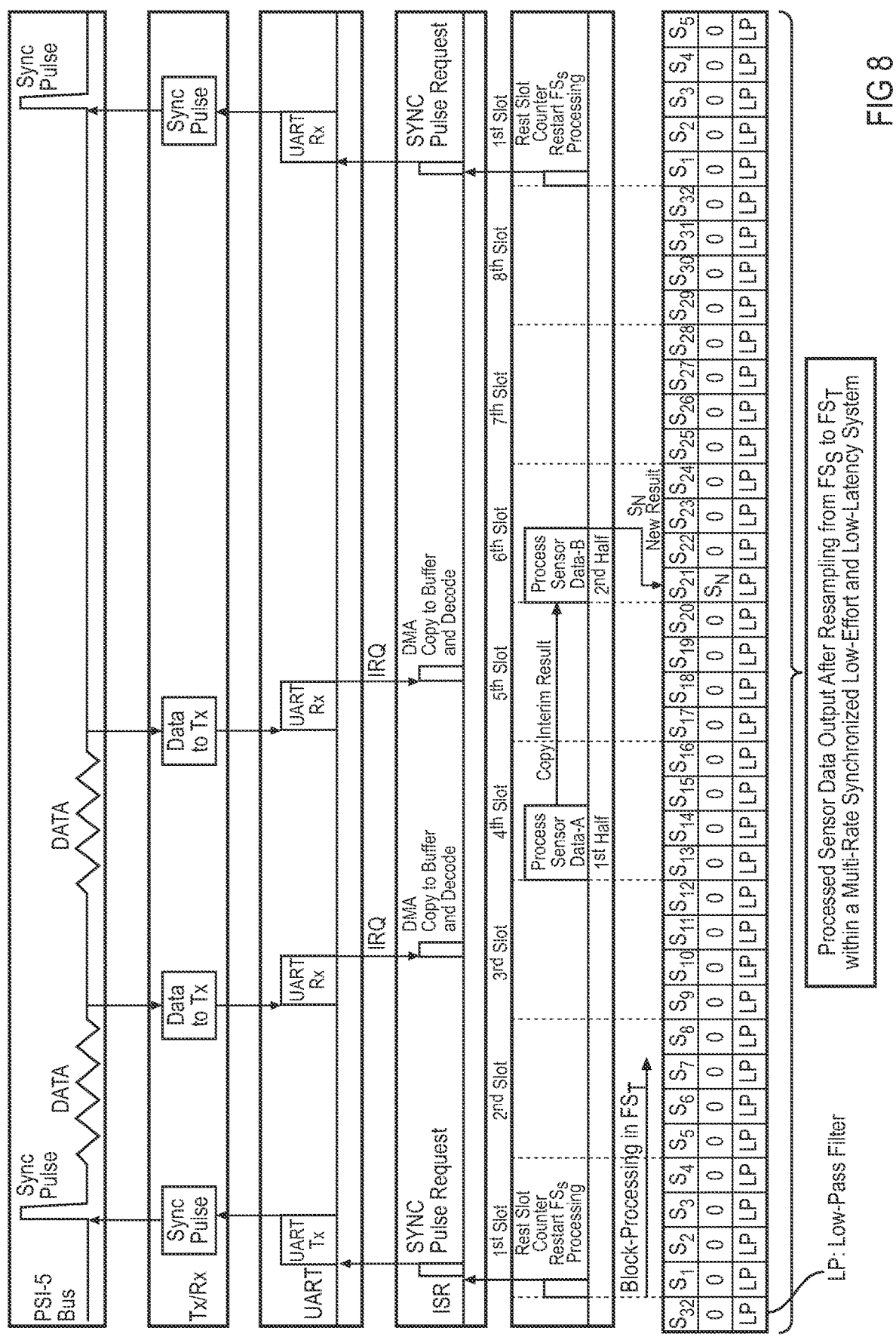
FIG. 8 is a signal-over-time diagram illustrating the timing of another exemplary synchronization method.

Such a result can also be achieved with an alternative mechanism as shown in FIG. 8. The processed sensor data, i.e., the result of the processing of the sensor data, may be output in one earlier slot if the sensor data decoding is not executed in a dedicated audio slot of the processor sample rate $FS_T$. Instead, the sensor data decoding is again shifted to the UART data receive ISR. The ISR may compensate additional calculation complexity by reducing the sensor data decoding to a few static operations if the type of sensor data is predefined. Additionally, a finite impulse response (FIR) filter calculation matrix of a multiple-input multiple output (MIMO) system allocates complexity between two sensor data packages A and B. For example, the processing complexity of one FIR matrix may be divided into two FIR matrices without compromising on the total computational complexity. It can be considered that the computational complexity of the chopped half FIR matrix is almost half of the total FIR matrix. The processor is operated again at a processor clock frequency $FS_T$ of 48 kHz for audio application, while the sensor and sensor processing is executed at the sensor clock frequency $FS_S=1.5$ kHz.

A multi-rate system can be established with M being 32, in which an audio interrupt occurs every fourth sample at 48 kHz and in total eight audio interrupts are available within the time period $T_S$ for algorithm-processing. In the first slot, the synchronization pulse (SYNC pulse) is triggered, starting a waiting period for the sensor data acquisition through UART and PSI-5 transceiver until the decoded sensor data package A is available in the 3rd slot and the decoded sensor data package B is available in the 5th slot. The delay compensation unit may employ a fixed timing scheme, according to which, for example, the algorithm-processing is performed partly in the 4th slot and partly in the 6th slot. While the final processing result is available in 6th slot, the FIR matrix processing complexity may be optimized and allocated between two slots instead of performing all processing in one slot. In this way, the peak number of processing operations per time, e.g., million instructions per second (MIPS), can be halved. In the 6th slot the interpolation mechanism may update the 21th sample in the time domain set out by the processor clock frequency $FS_T$ to the newest processing result $S_N$. Since low-pass filtering by the anti-alias filter is applied in all slots, the processing result is available after 21 samples at the target sample rate, which is the processor sample rate $FS_T$. Here, too, latency can be improved by 4 samples of the processor sample rate $FS_T$, which equates in the present example to a time gain of 83.33 μs.

Figure 9:
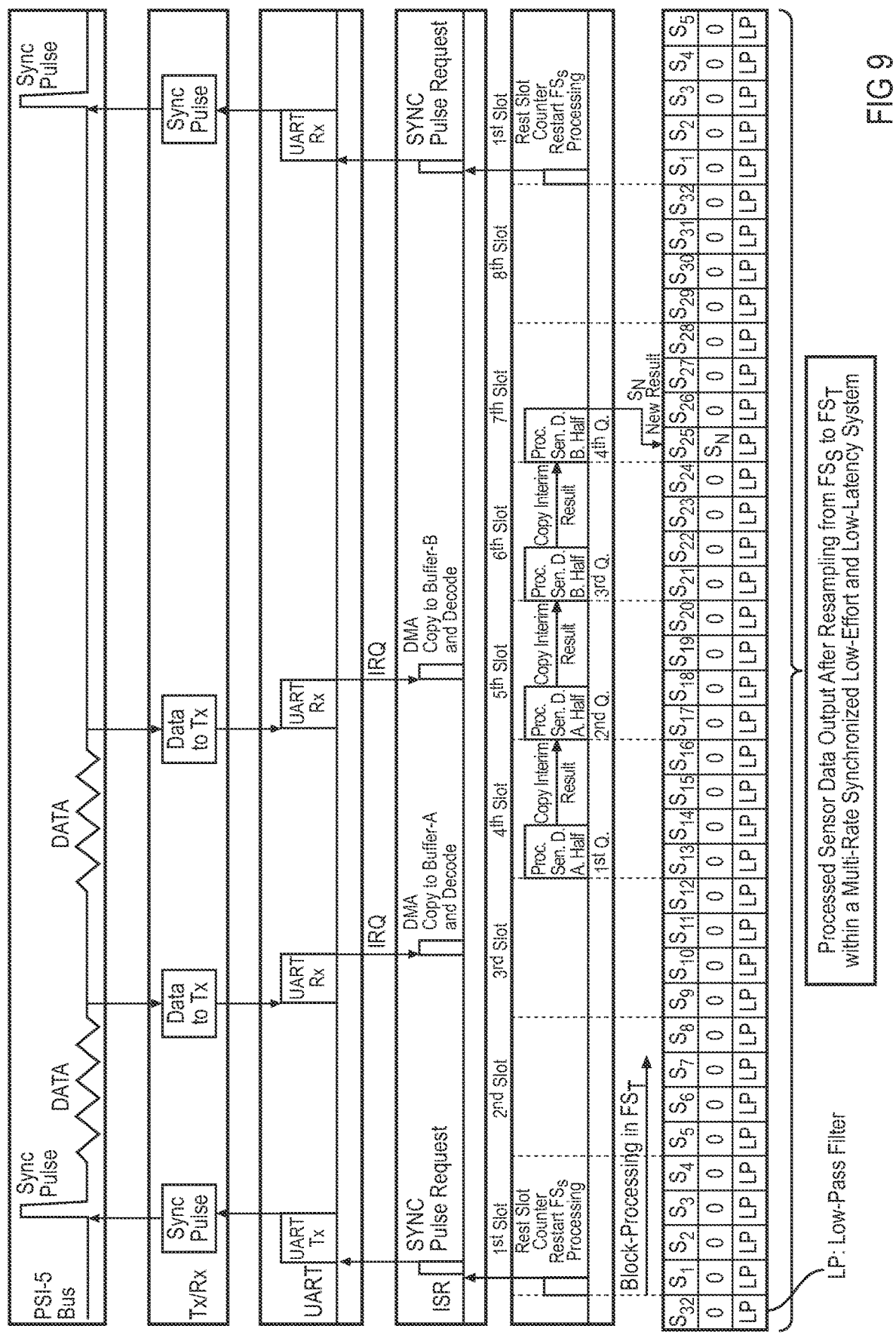
FIG. 9 is a signal-over-time diagram illustrating the timing of another exemplary synchronization method.

In another example shown in FIG. 9, the processed sensor data are output and kept in the 7th slot, and the sensor data decoding is not executed in a dedicated audio slot of the processor sample rate $FS_T$. Instead the sensor data decoding is again shifted to the UART data receive ISR. The ISR may compensate additional processing complexity by reducing the sensor data decoding to a few static operations if the type of sensor data is predefined. Additionally a finite impulse response (FIR) filter calculation matrix of a multiple-input multiple output (MEMO) system allocates equally complexity between two sensor data packages A and B, i.e., according to a 50:50 ratio. Here, the processing complexity of one FIR matrix may be divided into four FIR matrices, without compromising on the total computational complexity. It can be considered that the computational complexity of the chopped quarter FIR matrix is approximately a quarter of that of the total FIR matrix. Here as well, the processor is operated at a processor clock frequency $FS_T$ of 48 kHz for audio applications, while the sensor and sensor processing is executed at the sensor clock frequency $FS_S=1.5$ kHz.

A multi-rate system can be established with M being 32, in which an audio interrupt occurs every fourth sample at 48 kHz and in total eight audio interrupts are available within the time period $T_S$ for algorithm-processing. In the first slot, the synchronization pulse (SYNC pulse) is triggered, starting a waiting period for the sensor data acquisition through UART and PSI-5 transceiver until the decoded sensor data package A is available in the 3rd slot and the decoded sensor data package B is available in the 5th slot. The delay compensation unit may employ a fixed timing scheme, according to which, for example, the algorithm-processing is performed partly in the 4th slot, 5th slot, 6th slot and 7th slot. While the final processing result is available in 7th slot, the FIR matrix calculation complexity may be optimized and allocated between four slots instead of performing all processing in one slot. In the 4th slot and the 5th slot a respective half of sensor data package A and in the 5th slot and the 6th slot a respective half of sensor data package B is processed with a quarter of the FIR matrix.

In this way, the peak number of calculation operations per time, e.g., million instructions per second (MIPS), can be reduced to a quarter. In the 7th slot the interpolation mechanism may update the 21th sample in the time domain set out by the processor clock frequency $FS_T$ to the newest processing result $S_N$. Although no latency improvement can be realized, the peak calculation complexity is almost half of the attainable optimum as the FIR matrix calculation may be distributed equally over all eight slots. Reducing the peak number of processing operations per time to a quarter allows for employing even more complex MIMO systems or implementing existing algorithms on smaller and more cost effective processors.

Figure 10:
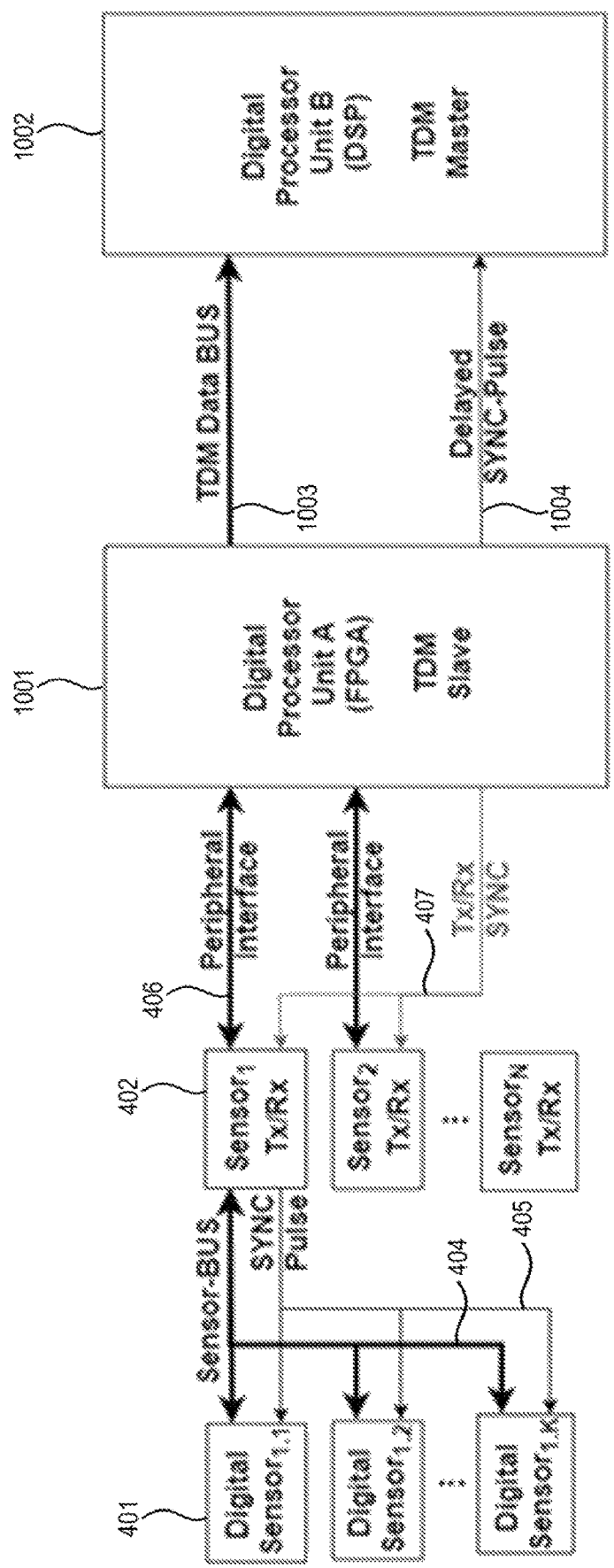
FIG. 10 is a schematic diagram illustrating a structure of an exemplary multi-rate system in one processer/one integrated circuit implementation.

Referring to FIG. 10, in existing architectures it may not be possible to replace the main algorithm processor by a processor that meets the sensor peripheral requirements due to various reasons. Therefore, it may be desired to enhance such existing architectures in order to adapt them to digital sensors and, thus, to implement additional features and functions on existing hardware platforms, e.g., an existing IC. One way is to utilize an additional processor A in a first IC 1001 along with a second IC 1002 featuring the existing processor, referred to as processor B, which is in the present example a DSP and which may be fully stretched in terms of serial peripherals due to hardware restrictions so that only auxiliary audio interfaces are available. The first IC 1001 is connected to the second IC 1002 via a TDM data bus 1003 and a delayed synchronization pulse line 1004. The first IC 1001 is connected to the sensors via the sensor transceivers similar to a single IC as shown in FIG. 4. Consequently, the N sensor transceiver units 402 are connected on one side via sensor bus 404 and a synchronization pulse line 405 to the K digital sensors 401, and on the other side via a peripheral interface 406 and a transceiver synchronization line 407 to the first IC 1001. Additionally, the DSP may natively only support time division multiplex (TDM) interfaces having a 48 kHz audio sample rate. It is further assumed that a multi-rate system can only be established in software, in which M=32. IC 1001 may host a field-programmable gate array (FPGA), which is simple to adapt to different environments and low-cost, and may be applied here as a companion host transceiver between IC002, i.e., the DSP, and the sensor transceiver 402.

A design as shown in FIG. 10, even when having a complex architecture, allows for low-complexity and low-latency multi-rate synchronized sensor data acquisition and processing, but may be further enhanced, for example, in that the digital sensor data synchronization pulse is generated by the first IC 1001, which is the interface between the sensor sample rate $FS_S$ and the target sample-rate $FS_T$, and which may be linked to the second IC 1002 via a DSP standard TDM multichannel audio interface, operated with the target sample rate $FS_T$. Therefore, the first IC 1001 may handle the sensor data trigger and reading and just issue new sensor data on the TDM interface for the DSP in the first IC 1001 once a new sample has been received. Since the update rate with new sensor data on the TDM interface, which is operated with the target sample rate $FS_T$, is l/M of the TDM sample rate, the first IC 1001 decodes and holds the last sample on the TDM interface until a newer sensor sample is available.

Figure 11:
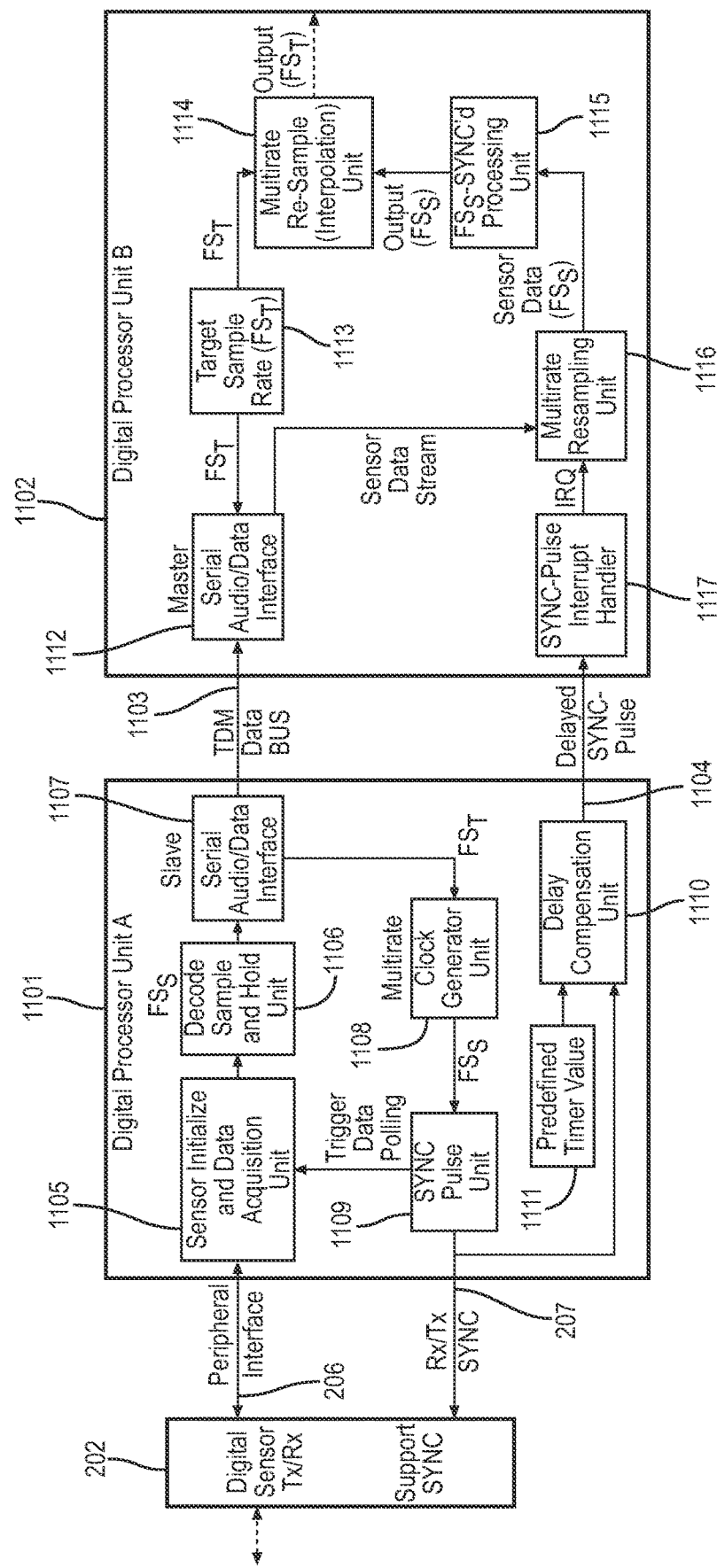
FIG. 11 is a schematic diagram illustrating a more detailed structure of the exemplary multi-rate system shown in FIG. 10.

FIG. 11 illustrates an exemplary implementation with two processors in two ICs in more detail. A first processor A, which may be a FPGA in a first IC 1101, is operatively coupled with a second IC 1102 featuring a second processor B, which is in the present example a DSP, via a TDM data bus 1103 and a delayed-synchronization-pulse line 1104. The first IC 1101 is connected to the sensors 201 (not shown in FIG. 11) via the sensor transceivers 202 which are similar to the single processor/single IC implementation shown in FIG. 5. Particularly, the N sensor transceiver units 202 are connected on one side via the sensor bus 204 (not shown in FIG. 11) and the synchronization pulse line 205 (not shown in FIG. 11) to the K digital sensors 201, and on the other side via a peripheral interface 206 and a transceiver synchronization line 207 to the first IC 1101.

The first IC 1101 may include a sensor initialize and data acquisition unit 1105, which receives the data stream from the transceiver 202, and a data decode and sample-and-hold unit 1106, which is operated with the sensor sample rate FSs and which is connected between the sensor initialize and data acquisition unit 1105 and a slave serial audio data interface 1107. The slave serial audio data interface 1107 outputs signals to the TDM data bus 1103 and to a multi-rate clock generator unit 1108 with the target sample rate $FS_T$. Based on the clock signal, which is output by the multi-rate clock generator unit 1108 with the sensor sample rate $FS_S$, the synchronization signal, e.g., synchronization pulse, is generated by a synchronization pulse generation unit 1109 and distributed to the sensor transceiver 202 and to a delay compensation unit 1110. The synchronization pulse generation unit 1109 further generates a signal for triggering data polling in the sensor initialize and data acquisition unit 1105. The delay compensation unit 1110 may further receive a predefined timer value from a register 1111 and provide the delayed synchronization pulse to the delayed-synchronization-pulse line 1104.

The second IC 1102 may include a master serial audio data interface 1112 which receives the signals on the TDM data bus 1103 and a target clock signal with a clock frequency corresponding to the processor sample rate, i.e., the target sample rate $FS_T$, and which outputs a sensor data stream. The target clock signal is generated by a clock generator 1113 which further supplies the target clock signal to a multi-rate re-sampling (interpolation) unit 1114. The multi-rate resampling (interpolation) unit 1114 is further operatively coupled to an algorithm processing unit 1115 and receives therefrom a sensor data signal at the sensor data rate $FS_S$, and outputs the final data stream at the target frequency $FS_T$. The algorithm processing unit 1115 is operatively coupled to a multi-rate resampling unit 1116. The multi-rate resampling unit 1116 is operatively coupled with the master serial audio data interface 1112, from which it receives the sensor data stream, and with a synchronization pulse interrupt handler 1117, from which it receives an interrupt service request (IRQ). The synchronization pulse interrupt handler 1117 is operatively coupled with the delayed-synchronization-pulse line 1104 for receiving the delayed synchronization pulse.

Figure 12:
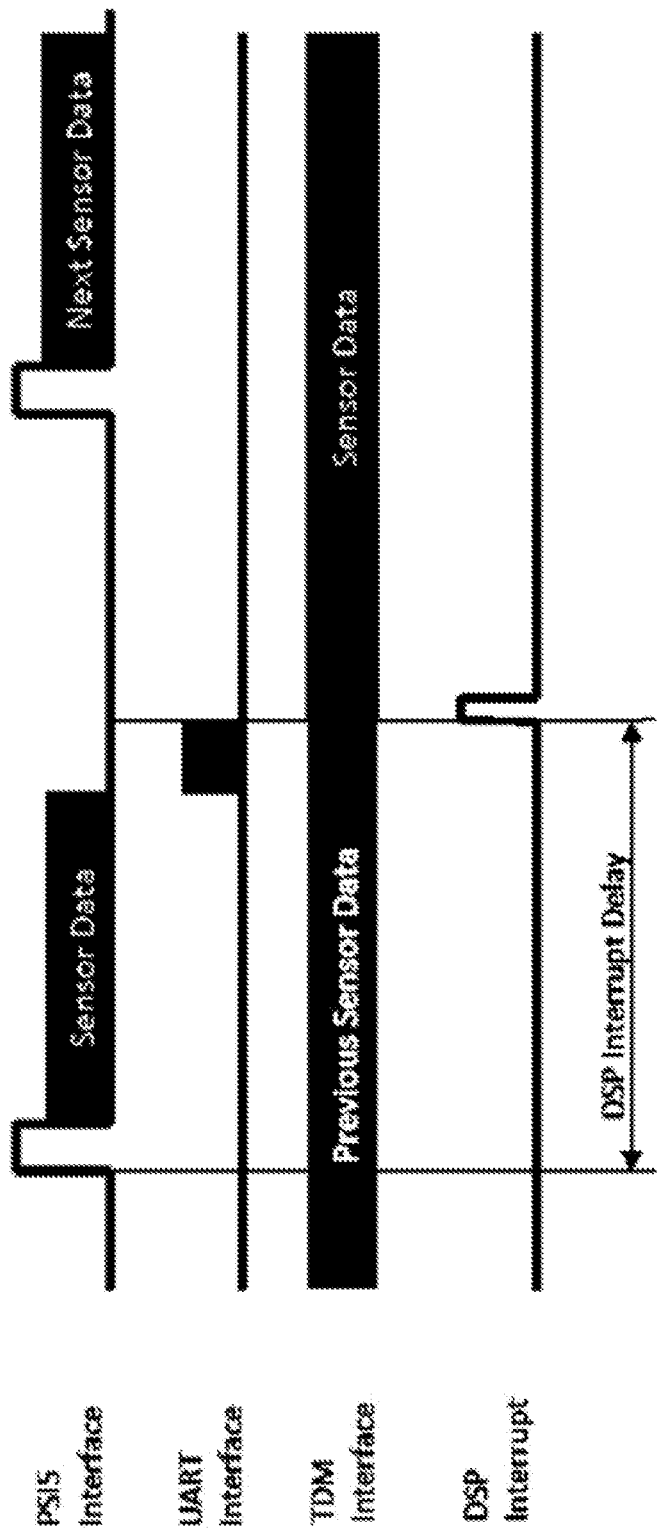
FIG. 12 is a signal-over-time diagram illustrating the timing of an exemplary synchronization method that includes interrupt delay.

Referring to FIG. 12, on DSP side, the sensor samples can be taken from the TDM interface if the correct timing is known soon after the new sensor sample is issued on the TDM interface. Therefore, the first processor, e.g., the FPGA, generates a delayed synchronization pulse to trigger an interrupt of the second processor, e.g., the DSP. This interrupt may be used to synchronize the DSP in terms of sensor synchronization pulse, sensor data bit-stream transport and acquisition delays, using a predefined timing value based on measurements and sensor and transceiver datasheet timing requirements.

The latency between the point in time when the sensor data are requested with the sensor sample rate $FS_S$ and the point in time when the algorithm-processing result is available with the target sample rate $FS_T$ may determine the sensor-to-output latency. In specific, for ANC systems, such as e.g. RNC systems, this latency is a crucial factor for success of the whole system. Little to no latency should be lost in this way. Along the processing chain, first, the physical synchronization pulse, which causes a latency $t_{SYNC}$, is generated. However, the digital sensor itself is already affected by a latency $t_{Sensor}$ as the sensor consumes time to convert the physical quantity to be sensed into a digital domain signal and to apply some sensor specific signal conditioning. Second, triggering a new sensor sample and transferring the sample from the digital sensor to the sensor transceiver generates a latency $t_{Sensor \to Tx/Rx}$. Third, once having arrived at the sensor transceiver, the sensor data stream is acquired by the processor and decoded to sensor data samples, which generates a latency $t_{Decode}$. Because the data transfer from the sensor may be affected by jitter and timing deviations, such as timing conditions for the involved hardware, a specific offset time $t_{Offset}$ may be considered to guarantee that the data transfer has been finished before a sensor data sample is used in the algorithm processing the sensor data sample can issue on the TDM stream to the DSP.

The TDM processing itself also consumes time, referred to as latency $t_{TDM}$, because e.g. ping-pong buffer techniques may be applied, and the sample may be used for the algorithm processing. Any appropriate algorithm can be processed. For example, in adaptive applications such as ANC or RNC the sensor data may be used as echo or reference data, so that the sensor data may be input into MIMO FIR-filter matrix, in which signal processing consumes time, referred to as a latency $t_{Process}$. Finally, the result of the processing is interpolated according to an, e.g., "sample-and-hold" or "sample-and-zero" method in connection with low-pass filtering to suppress anti-alias effects. The interpolation process itself does not add latency, but the low-pass filtering adds a latency $t_{Low-Pass}$, which is to be considered. Since the process chain includes two separate processors, the latency does not simply accumulate.

The synchronization is implemented utilizing a delayed synchronization interrupt request from the host processor, in which the main processor may employ a standard GPIO line to trigger the interrupt. This interrupt, which has its own timing and generates a latency $t_{ISR}$, advises the main processor once a new valid sensor sample is available on the TDM stream and may be used for algorithm processing in a synchronized multi-rate manner with the sensor clock frequency $FS_S$. Therefore, the host processor needs to wait a predefined time, referred to as latency $t_{Delayed-SYNC}$, after the sensor sample request was triggered and until the main processor synchronization interrupt can be triggered. The latency $t_{Delayed-SYNC}$ can be described as:

$$t_{Delayed-SYNC} = t_{Sync-Pulse} + t_{Sensor \to Tx/Rx} + t_{Tx/Rx \to Host} + t_{Offset} + t_{Decode} + t_{TDM} - t_{ISR}$$

For example, a physical synchronization pulse transferred in parallel or integrated in the sensor bus finally requests a new sensor sample from the digital sensor in synchronization with the underlying sensor sample rate $FS_S$. The sensor-to-output latency $t_{Sensor \to Output}$ can, thus, be described here as follows:

$$t_{Sensor \to Output} = t_{Sensor} + t_{Delayed-Sync} + t_{Process} + t_{Low-Pass}$$

Since the time for the sensor delay compensation plus the algorithm processing is significant but small compared to the sensor sample rate period time $T_S$, the calculation result is available before the next sensor sample is requested. Immediately after the result of the algorithm processing is available, the re-sampling/up-sampling to processor clock frequency $FS_T$ can be triggered, wherein a simple interpolation technique may be applied employing typical low-pass filtering for anti-alias protection.

In can be seen that the time consumption for sensor bit-stream transportation and decoding is insignificant compared to the time lost on sensor side and for algorithm processing and interpolation low-pass filtering. Because, on the sensor side, the latency is hardware related and cannot easily be improved, latency improvement measures are focused on algorithm processing and low-pass filtering. For example, adaptive algorithms may include ANC algorithms such as, for example, RNC. As can be further seen, synchronization mechanisms that are based on multi-rate data acquisition on digital sensors allow for a sensor data processing with low complexity and low latency also when utilizing two processor units, in which one of the processors acts as a transceiver host in order to enable the technology on an existing architecture design that per se would not be able to operate with such digital sensor technology. For any algorithm, e.g., adaptive algorithms, used in connection with digital sensors that are not able to operate with a target audio sample rate, the algorithm triggers its processing routines in order to establish a synchronized multi-rate manner for receiving the sensor data. Hence, in a single processor environment the internal software routines will generate a trigger request to the sensor transceiver to allow for processing the data in a multi-rate synchronized mode. Although the enhancements made on latency and complexity, are discussed above mainly in connection with the single processor/single IC design, it can also be used with a multiple processors/multiple ICs design as also illustrated above.

In a dual processor system, one processor acts as transceiver host and, thereby, improves the performance of the algorithm, e.g., adaptive algorithms since the algorithm is only executed when the latest sensor data is available to lower the system latency, which enables multi-rate processing. Therefore, no additional delay, asynchronous sample rate converter (ASRC) or other asynchronous processing lowers the total system performance. For example, the technology can also be used to expand existing audio signal processing designs by new features such as RNC, if the involved design has enough processing power but not enough peripheral resources, at reasonable complexity without compromising performance, by implementing a multi-rate synchronized design with little to no loss in sensor latency.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an clement or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

It is recognized that any processor such as computer, microprocessor, signal processor and microcontroller as disclosed herein may include any number of processor units, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The computer(s), processor(s) and controller(s) as disclosed also include hardware based inputs and outputs for receiving and transmitting data, respectively from and to other hardware based devices as discussed herein.

While various embodiments of the invention have been described, it will be apparent to those of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. A method for multi-rate synchronization of a digital sensor that provides a digital sensor output signal and a processor arrangement that processes the digital sensor output signal according to a processing algorithm and that provides a processor output signal, the method comprising the steps of:
   operating the digital sensor to provide the digital sensor output signal with a first sample rate;
   in a processor arrangement that has a main processor and a host processor, the processor arrangement is separate from a transceiver of the digital sensor, the main processor has a second sample rate that is an integer multiple of the first sample rate;
   generating a trigger signal in the host processor at the first sample rate, the trigger signal triggers polling of the digital sensor output signal when a new sample of the digital sensor output signal is available;
   forwarding the trigger signal to the digital sensor to synchronize polling of the digital sensor output signal at the first sample rate;
   forwarding the trigger signal to the main processor;
   in response to receiving the trigger signal from the host processor, the main processor samples the digital sensor output signal using both the first and the second sample rates;
   synchronizing, in the main processor, the digital sensor output signal of the first sample rate with the digital signal sensor output signal of the second sample rate thereby generating a processor output signal at the second sample rate; and
   outputting the processor output signal at the second sample rate.

2. The method of claim 1, further comprising the step of:
   delaying the trigger signal that triggers processing of the digital sensor output signal when a new sample of the digital sensor output signal is available.

3. The method of claim 1, wherein the digital sensor output signal is a data stream including data from the digital sensor, the method further comprising the step of decoding the data of the data stream from the digital sensor.

4. The method of claim 3, wherein the data from the digital sensor are of a predefined data type and the step of decoding is performed immediately upon receipt of the data stream from the digital sensor by the processor arrangement.

5. The method of claim 1, further comprising the step of compensating delays occurring before processing of the digital sensor output signal according to the algorithm.

6. The method of claim 5, wherein the step of compensating the delays is based on a fixed compensation scheme.

7. The method of claim 1, further comprising the step of interpolating the processor output signal using at least one of sampling and low-pass filtering of the processor output signal.

8. A system for multi-rate synchronization of a digital sensor that is configured to provide a digital sensor output signal and a processor arrangement that is configured to process the digital sensor output signal according to a processing algorithm and to provide a processor output signal, wherein:
   the digital sensor is further configured to provide the digital sensor output signal with a first sample rate;
   the processor arrangement is separate from a transceiver of the digital signal processor, the processor arrangement has a main processor and a host processor, the main processor has a second sample rate that is an integer multiple of the first sample rate;
   a trigger signal is generated in the host processor of the processor arrangement when a new sample of the digital sensor output signal is available;
   the trigger signal is forwarded to the digital sensor to trigger polling of the digital sensor output signal;
   the trigger signal is forwarded to the main processor to trigger sampling of the digital sensor output signal using the first and second sample rates;
   the main processor of the processor arrangement synchronizes the digital sensor output signal using both the first and the second sample rates thereby generating a processor output signal; and
   the processor output signal is output by the main processor using the second sample rate.

9. The system of claim 8, wherein the processor arrangement is further configured to:
   delay the trigger signal that triggers processing of the digital sensor output signal when a new sample of the digital sensor output signal is available.

10. The system of claim 8, wherein the digital sensor output signal is a data stream including data from the digital sensor, the method further comprising decoding the data of the data stream from the digital sensor.

11. The system of claim 10, wherein the data from the digital sensor are of a predefined data type and decoding is performed immediately upon receipt of the data stream from the digital sensor by the processor arrangement.

12. The system of claim 8, wherein the processor arrangement is further configured to compensate delays occurring before processing of the digital sensor output signal according to the algorithm.

13. The system of claim 12, wherein compensating the delays is based on a fixed compensation scheme.

14. The system of claim 8, wherein the processor arrangement is further configured to interpolate the processor output signal, interpolating the processor output signal using at least one of sampling and low-pass filtering of the processor output signal.

* * * * *